(12) United States Patent
Chimura

(10) Patent No.: US 8,422,074 B2
(45) Date of Patent: Apr. 16, 2013

(54) PRINT DATA GENERATING DEVICE

(75) Inventor: Eijiro Chimura, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 693 days.

(21) Appl. No.: 12/640,453

(22) Filed: Dec. 17, 2009

(65) Prior Publication Data
US 2010/0149566 A1 Jun. 17, 2010

(30) Foreign Application Priority Data

Dec. 17, 2008 (JP) .................... 2008-320927
Jan. 16, 2009 (JP) .................... 2009-007181

(51) Int. Cl.
*G06K 15/00* (2006.01)
*G06K 15/02* (2006.01)
*G06K 9/32* (2006.01)
*H04N 1/37* (2006.01)
*H04N 1/04* (2006.01)

(52) U.S. Cl.
USPC ............ 358/1.9; 358/458; 358/1.18; 358/1.2; 358/450; 358/498; 382/293

(58) Field of Classification Search .............. 358/458, 358/1.18, 1.2, 450, 498; 382/293
See application file for complete search history.

(56) References Cited

U.S. PATENT DOCUMENTS
2004/0012814 A1 1/2004 Tanaka et al.
2005/0099660 A1 5/2005 Yada et al.

FOREIGN PATENT DOCUMENTS
| JP | H02-143380 A | 6/1990 |
| JP | 2000-127547 A | 5/2000 |
| JP | 2002-300369 A | 10/2002 |
| JP | 2004-142435 A | 5/2004 |
| JP | 2008-142969 A | 6/2008 |

OTHER PUBLICATIONS

Japan Patent Office; Notification of Reason for Refusal for Patent Application No. 2009-007181, mailed Jan. 18, 2011.

*Primary Examiner* — Akwasi M Sarpong
(74) *Attorney, Agent, or Firm* — Baker Botts L.L.P.

(57) ABSTRACT

A print data generating device includes: (a) a display; (b) a print-image-region selector for selecting a print image region which is a region of an original-data-based image, such that the selected print image region corresponds to each of desired images; (c) a media size recognizer for recognizing a size of a print medium; (d) a print layout determiner for determining, based on a size of the print image region and the recognized size of the print medium, a print layout of the desired images that are to be printed onto the print medium, such that a number of the desired images printable onto the print medium is maximized in the determined print layout; and (e) a display controller for causing the display to display a print layout preview showing the desired images that are arranged according to the determined print layout. The print data generating device generates a print data which is used for printing, in conformity with the print layout preview, the desired images arranged according to the determined print layout, onto the print medium.

11 Claims, 10 Drawing Sheets

PRINT DATA GENERATING DEVICE

CROSS REFERENCE TO RELATED APPLICATION

This application claims priority from Japanese Patent Applications No. 2008-320927 filed on Dec. 17, 2008 and No. 2009-007181 filed on Jan. 16, 2009, the disclosure of which is herein incorporated by reference in its entirety.

BACKGROUND OF THE INVENTION

1. Field of the Invention

The present invention relates to a print data generating device for generating a print data that is used for printing a plurality of desired images onto a print medium.

2. Discussion of Related Art

There is known a copy machine capable of establishing an aggregation mode for copying or printing a plurality of images that originate from respective original medium sheets, onto a plurality of print medium sheets, the number of which is smaller than the number of the original medium sheets, by reducing a size of each of the images. In this aggregation mode, it is possible to determine the number of the images that are to be copied or printed onto each of the print medium sheets, after the images have been read from the original medium sheets. Thus, in this copy machine, it is possible to prevent a final one of the print medium sheets, from having a large blank space on which any one of the images is not copied or printed.

SUMMARY OF THE INVENTION

However, the above-described copy machine does have means for printing a plurality of images that originate from a single original medium sheet, onto a single print medium sheet. Therefore, where a plurality of images each originating from a small original medium sheet such as business card are to be copied or printed onto a single print medium sheet by using the above-described copy machine, the print medium sheet would have a large blank space. The present invention was made in view of the background prior art discussed above. It is therefore an object of the invention to provide a print data generating device for generating a print data that is used for printing a plurality of desired images onto a print medium. This print data generating device includes: (a) a display; (b) a print-image-region selector configured to select a print image region which is a region of an original-data-based image that is based on an original image data, such that the selected print image region, which is surrounded by a boundary, corresponds to each of the plurality of desired images that are to be printed onto the print medium; (c) a media size recognizer configured to recognize a size of the print medium; (d) a print layout determiner configured to determine, based on a size of the print image region and the recognized size of the print medium, a print layout of the plurality of desired images that are to be printed onto the print medium, such that a number of the desired images printable onto the print medium is maximized in the determined print layout; and (e) a display controller configured to cause the display to display a print layout preview showing a desired number of the desired images that are arranged according to the determined print layout, such that the desired number of the desired images is not larger than the maximized number of the desired images. The print data generating device is configured to generate a preview-based print data as the print data which is used for printing, in conformity with the print layout preview displayed on the display, the desired number of the desired images arranged according to the determined print layout, onto the print medium.

BRIEF DESCRIPTION OF THE DRAWINGS

The above and other objects, features, advantages and technical and industrial significance of the present invention will be better understood by reading the following detailed description of presently preferred embodiment of the invention, when considered in connection with the accompanying drawings, in which.

DETAILED DESCRIPTION OF THE PREFERRED EMBODIMENT

Figure 1:
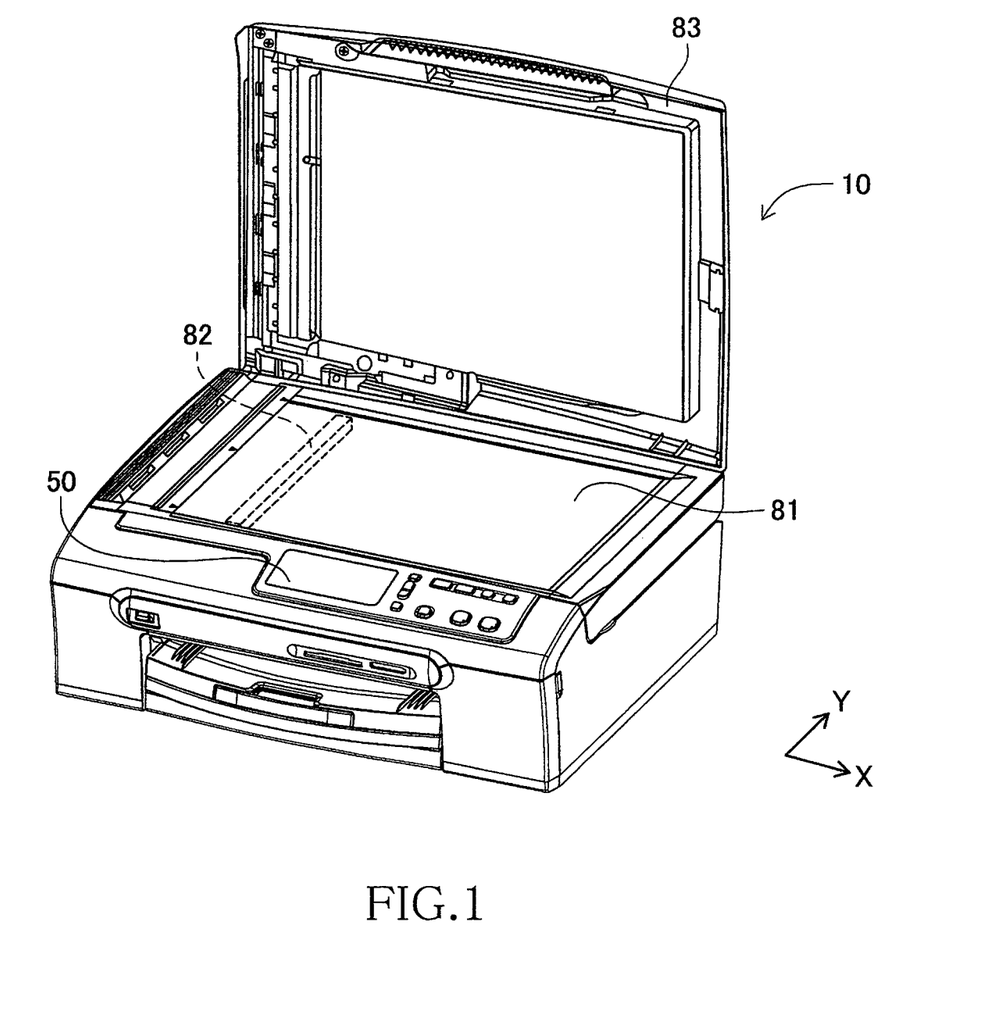
FIG. 1 is a view schematically showing a multifunction device 10 constructed according to an embodiment of the invention.

FIG. 1 is a perspective view showing a print data generating device in the form of a multifunction device 10 that is constructed according to an embodiment of the invention. The multifunction device 10 has various functions such as a printer function, a scanner function, a copy function, a facsimile function and a telephone function. As shown in FIG. 1, the multifunction device 10 has a generally rectangular shape as a whole, such that a height of the device 10 is smaller than a width and a depth of the device 10. A display panel 50 is provided on an upper front surface of the multifunction device 10. The display panel 50 is a touch panel that is capable of detecting presence and location of a touch of an operator within the display panel 50. In the following description, a direction parallel to the width of the device 10 will be referred to as X direction while a direction parallel to the depth of the device 10 will be referred to as Y direction (see FIG. 1).

A flat bed 81 is provided in an upper portion of the multifunction device 10. This flat bed 81 is made of a light transmittable material (e.g., glass), and has a size that allows a copy paper sheet of A4 size or A3 size to be disposed thereon. That is, an original medium such as the copy paper sheet is to be disposed on the flat bed 81, so that content of the original medium disposed on the flat bed 81 can be scanned. In the following description, the original medium will be referred to as "scanned medium".

A cover portion 83 is provided on an upper side of the flat bed 81, and is pivotable relative to the flat bed 81 so as to be positioned in an open position and a close position. The cover portion 83 is held in the close position while a content of the scanned medium disposed on the flat bed 81 is being read. Inside the multifunction device 10, there are disposed a light source carriage 82 and an image taking device. The light source carriage 82 is configured to carry a light source for irradiating a light onto the scanned medium. The image taking device includes an image taking element configured to take, as an image, a light reflected from the scanned medium. The light emitted from the light source carriage 82 penetrates through the flat bed 81 so as to be irradiated onto the scanned medium, and the light reflected from the scanned medium penetrates through the flat bed 81 so as to be taken by the image taking element (e.g., CCD). It is noted that the image raking device may be provided either inside or outside the light source carriage 82.

Figure 2:
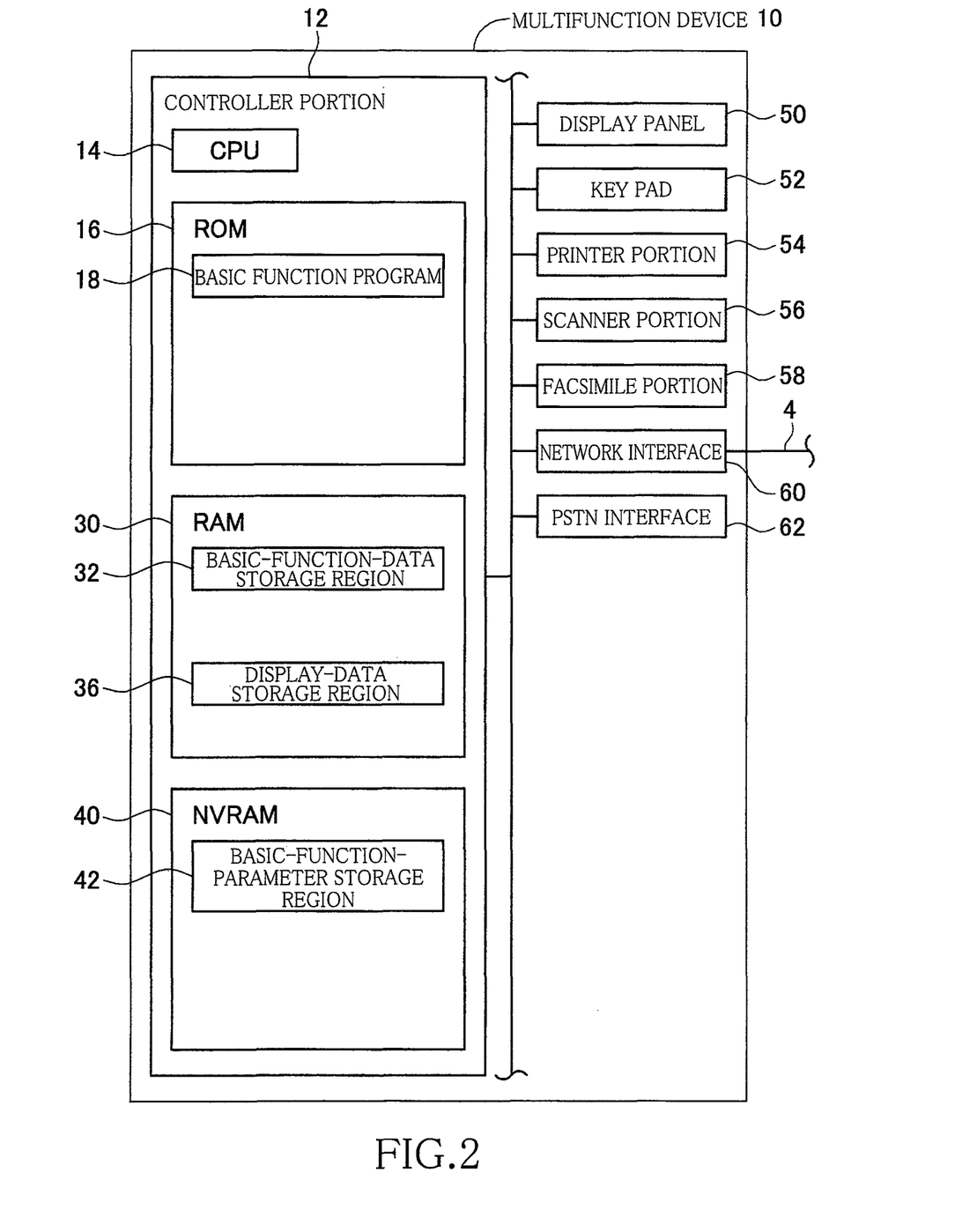
FIG. 2 is a view showing a functional construction of the multifunction device 10 of FIG. 1.

FIG. 2 shows a functional construction of the multifunction device 10. As shown in FIG. 2, the multifunction device 10 includes a controller portion 12, a display panel 50, a key pad 52, a printer portion 54, a scanner portion 56, a facsimile portion 58, a network interface 60 and a PSTN interface 62. The controller portion 12 includes a CPU 14, a ROM 16, a RAM 30 and a NVRAM 40. The above-described flat bed 81 and carriage 82 are included in the scanner portion 56.

The CPU 14 is configured to carry out various procedures in accordance with programs stored in the ROM 16. The procedures carried out by the CPU 14 will be described later in detail. The ROM 16 stores therein basic function programs 18 that are used for controlling basic functions of the multifunction device 10, for example, for controlling operations of the display panel 50, printer portion 54 and scanner portion 56. The basis function programs 18 includes a program or programs that are used for generating graphic data based on which graphic representation is to be displayed on the display panel 50.

The RAM 30 has a basic-function-data storage region 32 and a display-data storage region 36. The basic-function-data storage region 32 is a data storage that is assigned to store therein a print data or other various data that are generated in process of execution of the procedures in accordance with the basic function programs 18. The display-data storage region 36 is a data storage that is assigned to store therein the above-described graphic data.

The NVRAM 40 has a basic-function-parameter storage region 42 that is a data storage assigned to store therein various parameters (e.g., a parameter indicative of whether detection of the scanned medium is to be made automatically or manually) that are used when the CPU 14 executes procedures in accordance with the basic function programs 18.

The multifunction device 10 is connected to a LAN circuit through the network interface 60. The multifunction device 10 is capable of communicating with a personal computer that is connected thereto, and capable of accessing the Internet.

Referring next to FIGS. 3 to 7, there will be described an example of a printing operation that is performed by the multifunction device 10. In this example, a scanned medium (e.g., business card) has a size smaller than a size of the flat bed 81 of the scanner portion 56 or smaller than a size of a print medium, and a content of the scanned medium is copied or printed in each one of a plurality of portions of the print medium.

Figure 3:
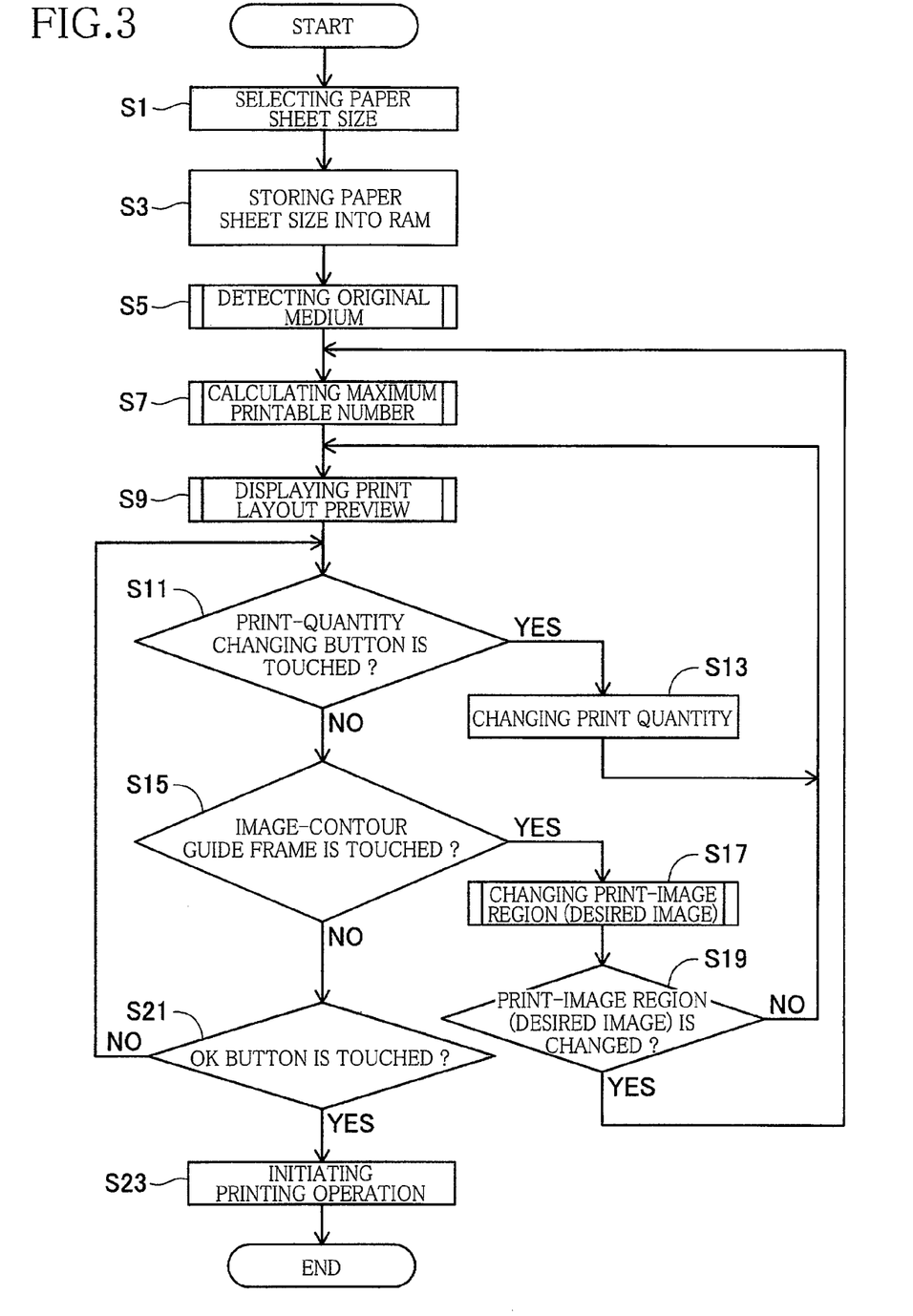
FIG. 3 is a flow chart showing a printing program as a main routine program, which is executed in the multifunction device 10 of FIG. 1.

FIG. 3 is a flow chart showing a printing program as a main routine program, which is executed when an operator selects a mode for printing the content of the same scanned medium in each one of a plurality of portions of a copy paper sheet as the print medium. This printing program is executed by implementing steps S1 through S23. It is noted that the mode selection is made by, for example, operating mode selection buttons that are displayed on the display panel 50.

The printing program is initiated with step S1 that is implemented to select a paper sheet size, which is represented by a length Xcopy and a width Ycopy of the copy paper sheet. The length Xcopy is a dimension of the copy paper sheet as measured in a direction parallel to a long side of the copy paper sheet. The width Ycopy is a dimension of the copy paper sheet as measured in a direction parallel to a short side of the copy paper sheet. The selection of the paper sheet size in this step S1 is made in accordance with selection made by the operator. For example, the operator can select one of a plurality of kinds of copy paper sheets that are indicated on the display panel 50. For example, where A4 copy paper sheet is selected, the print-medium length Xcopy and the print-medium width Ycopy are set to 297 (mm) and 210 (mm), respectively. A relationship between each size of copy paper sheet and the corresponding print-medium length Xcopy, print-medium width Ycopy is stored in the ROM 16. The implementation of step S1 is completed when the CPU 14 read, from the ROM 16, the print-medium length Xcopy and print-medium width Ycopy that correspond to the selected copy paper sheet.

Step S1 is followed by step S3 in which the CPU 14 causes the basic-function-data storage region 32 of the RAM 30 to store therein data representing the print-medium length Xcopy and print-medium width Ycopy.

Step S3 is followed by step S5 in which the CPU 14 detects presence of the scanned medium. Step S5 is implemented by executing an original-medium detecting program of FIG. 4, which is a subroutine program of the printing program of FIG. 3. Prior to detection of the scanned medium, the scanned medium is disposed on a right upper end portion of the flat bed 81 of the multifunction device 10 (see FIG. 8).

Figure 4:
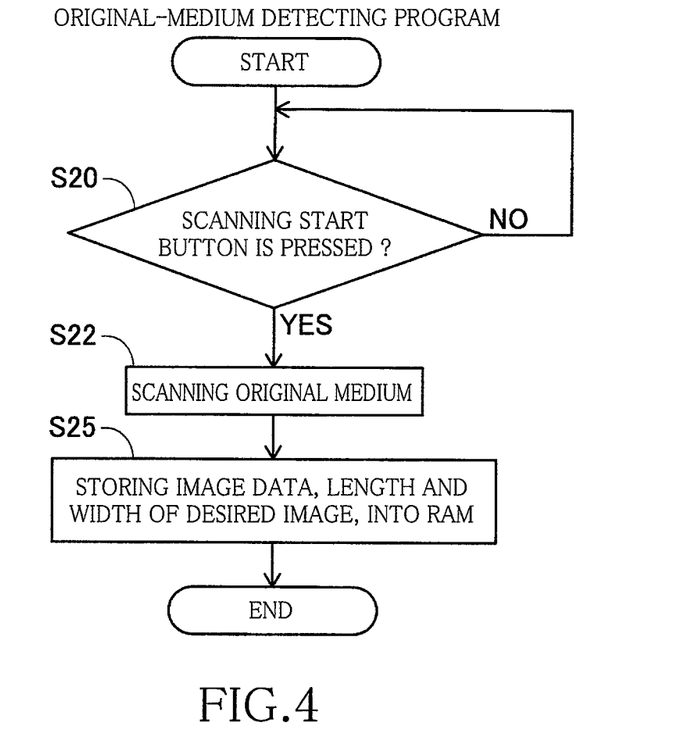
FIG. 4 is a flow chart showing an original-medium detecting program as a subroutine program of the of the printing program of FIG. 3.

The scanned medium detecting program of FIG. 4 is initiated with step S20 in which the CPU 14 judges whether a scanning start button has been pressed by the operator. The scanning start button is displayed, for example, on the display panel 50. While the scanning start button is not yet pressed (S20: NO), step S20 is repeated so that the CPU 14 waits the scanning start button to be pressed by the operator. The control flow goes to step S22 when the scanning start button is pressed (S20: YES).

Figure 8:
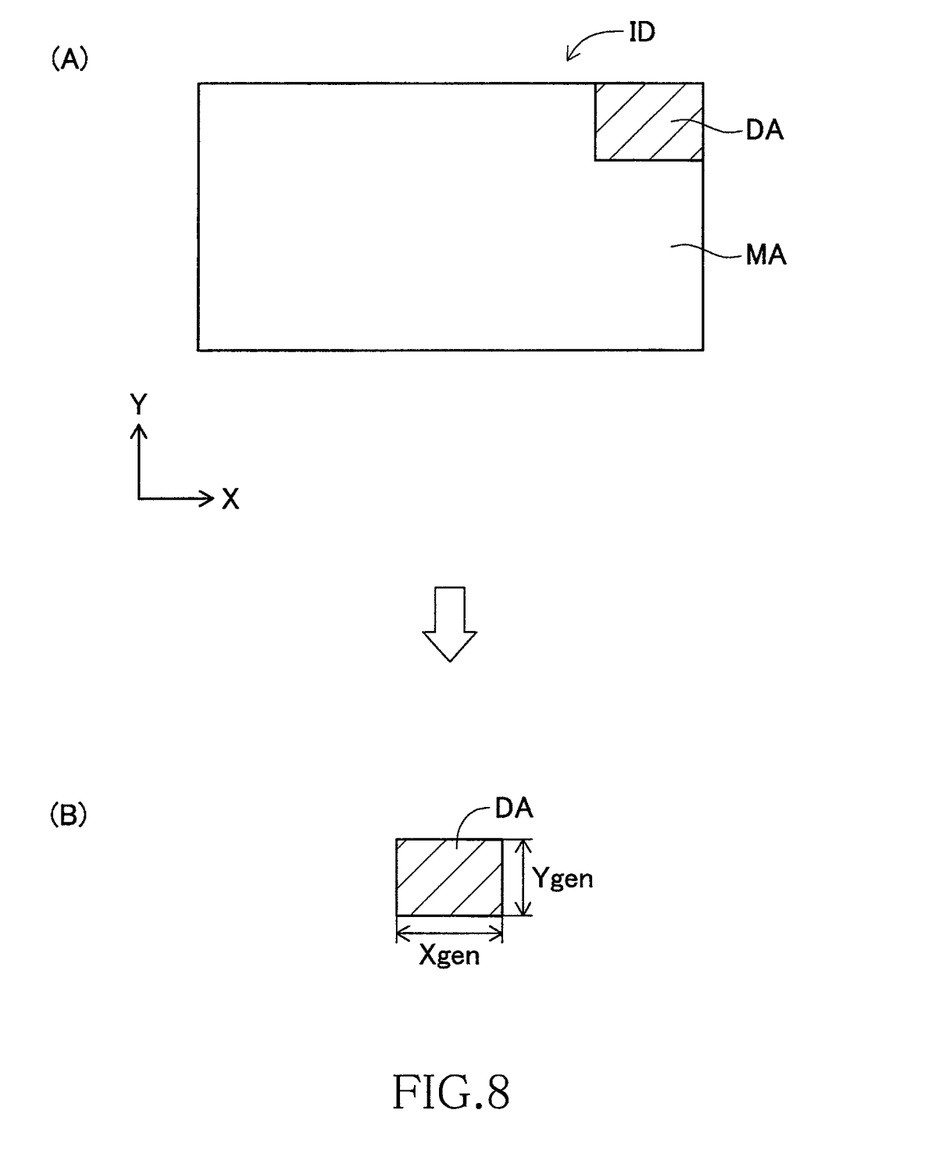
FIG. 8 is a set of view showing a medium-content representing portion DA that is a part of an original-data-based image ID.

In step S22, the CPU 14 commands the scanner portion 56 to read content of the scanned medium whereby a scanning operation is carried out by the scanner portion 56. In the scanning operation, an entirety of the flat bed 81 is scanned by the light source carriage 82 of the scanner portion 56 (see FIG. 1). FIG. 8 shows an original-data-based image ID based on an image data that is obtained in the scanning operation in a case where the scanned medium has a size smaller than the size of the flat bed 81. The original-data-based image ID includes a medium-content representing portion DA and also a blank portion MA, as shown in (A) of FIG. 8. The blank portion MA does not represent content of the scanned medium, while the medium-content representing portion DA (hatched in FIG. 8) represents the content of the scanned medium.

Step S22 is followed by step S25 in which the CPU 14 trims off the blank portion MA from the original-data-based image ID, so as to select the medium-content representing portion DA as a print image region that is surrounded by a boundary, as shown in (B) of FIG. 8. In the present embodiment, the scanned medium is a generally rectangular-shaped paper sheet having long sides and short sides, so that the medium-content representing portion DA is a generally rectangular-shaped portion having long sides and short sides. In the following description, a size of the medium-content representing portion DA as measured in a direction parallel to its long sides will be referred to as a desired-image length Xgen, while a size of the medium-content representing portion DA as measured in a direction parallel to its short sides will be referred to as a desired-image width Ygen. The trimming-off of the blank portion MA can be automatically made by an image recognition process that is carried out for detecting the scanned medium with the medium-content representing portion DA and the blank portion MA being distinguished from each other. Then, the CPU 14 causes the basic-function-data storage region 32 of the RAM 30 to store therein an image data representing the medium-content representing portion DA and data representing the desired-image length Xgen and desired-image width Ygen. The original-medium detecting program of FIG. 4 is completed with implementation of step S25. It is noted that detailed description of the image recognition process is not provided herein since the process is carried out in a known manner.

Owing to execution of the original-medium detecting program of FIG. 4, where the scanned medium smaller than the flat bed 81 is copied or printed, it is possible to exclude the blank portion MA from the selected print image region, for thereby making it possible to increase printing efficiency.

After step S5 has been implemented by executing the original-medium detecting program of FIG. 4, step S7 is implemented by the CPU 14 to calculate the number of copies, i.e., a maximum printable number MP of desired images PA that are printable onto the copy paper sheet whose size has been selected in step S1. Each of the desired images PA is provided by the above-described print image region, which corresponds to the medium-content representing portion DA at least when the print image region is selected for the first time. Once the size of each of the desired images PA, i.e., the print image region is changed as described below, each desired image PA does not correspond to the medium-content representing portion DA. The maximum printable number MP is calculated or determined based on the size of each desired image PA and the size of the copy paper sheet. Step S7 is implemented by executing a maximum-printable-number calculating program of FIG. 5, which is a subroutine program of the printing program of FIG. 3.

Figure 5:
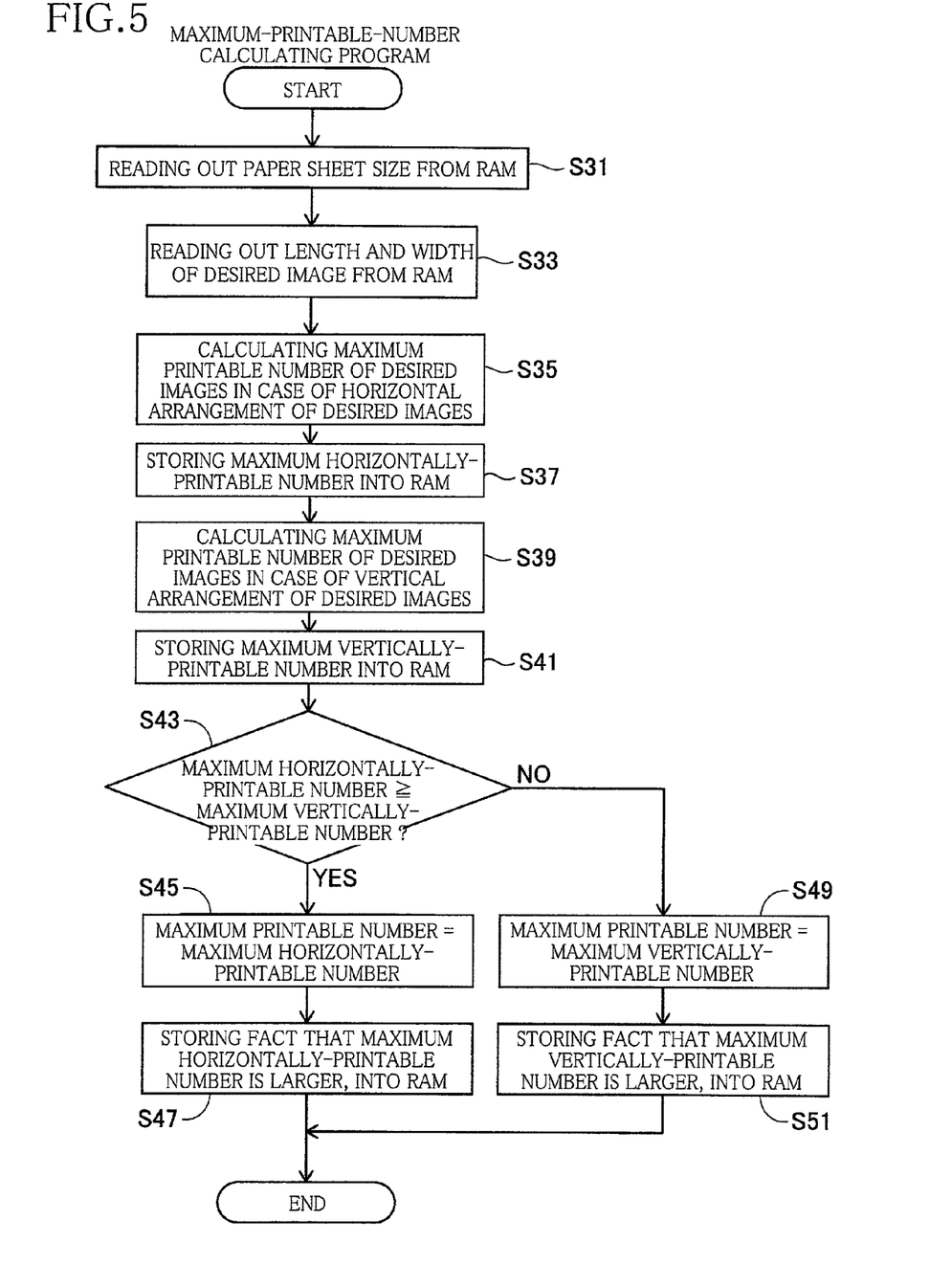
FIG. 5 is a flow chart showing a maximum-printable-number calculating program as a subroutine program of the of the printing program of FIG. 3.

The maximum-printable-number calculating program of FIG. 5 is initiated with step S31 in which the CPU 14 reads out data representing the above-described print-medium length Xcopy and print-medium width Ycopy, from the basic-function-data storage region 32 of the RAM 30. Step S31 is followed by step S33 in which the CPU 14 reads out data representing the above-described desired-image length Xgen and desired-image width Ygen, from the basic-function-data storage region 32 of the RAM 30.

Figure 9:
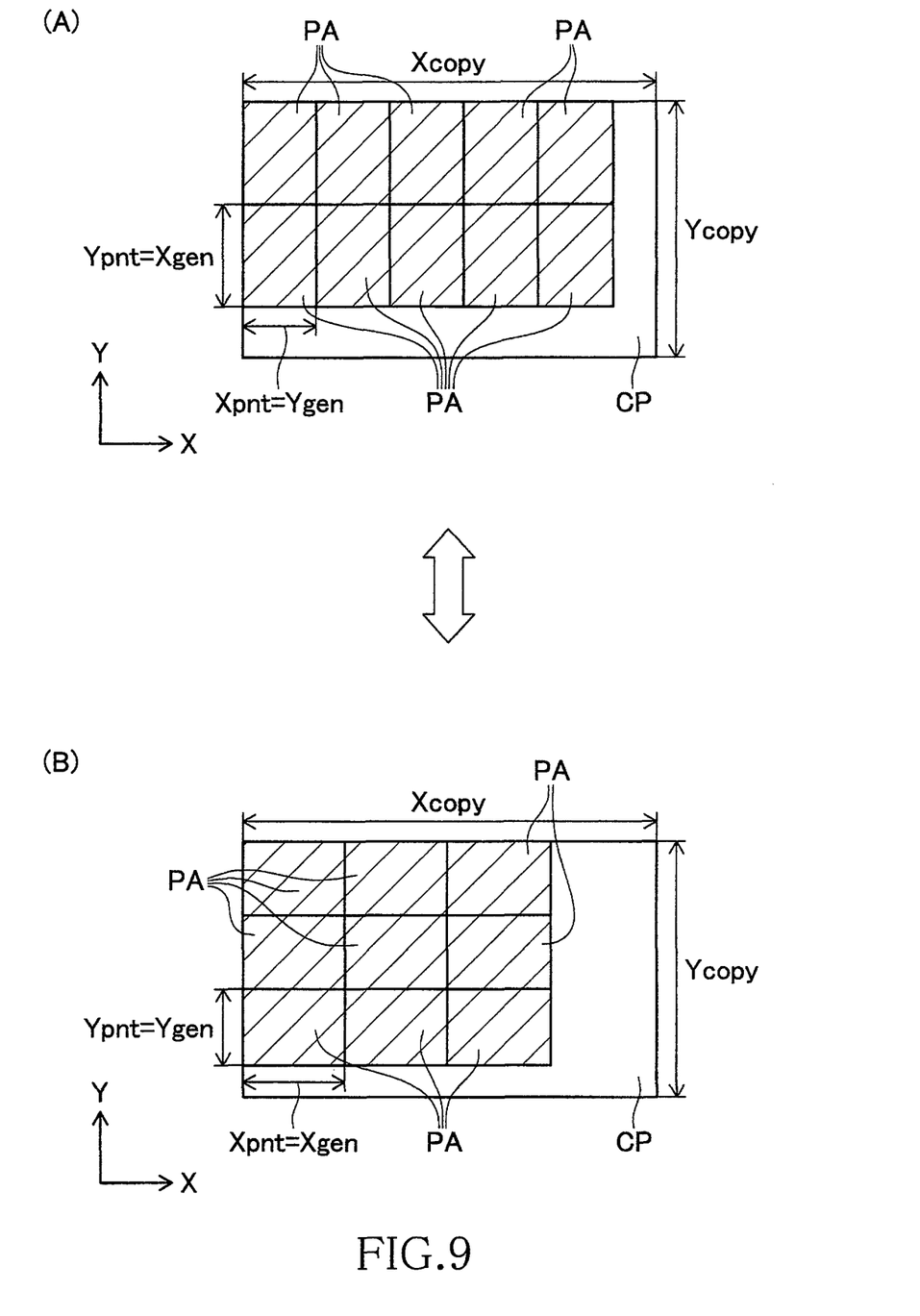
FIG. 9 is a set of views showing a maximum number Mt of the desired images PA that are printable onto a copy paper sheet CP in case of a vertical arrangement and also a maximum number My of the desired images PA that are printable onto the copy paper sheet CP in case of a horizontal arrangement.

Step S33 is followed by step S35 that is implemented to calculate, as a maximum horizontally-printable number (first maximum number) My, a maximum number My of the desired images PA that are printable onto the copy paper sheet CP without any one of the desired images PA overlapping with the other desired images PA, in case of a horizontal arrangement (first arrangement), as shown in (B) of FIG. 9, in which the desired images PA are arranged with the direction X parallel to the long sides of the copy paper sheet CP being coincident with the direction parallel to the long sides of each desired image PA. In this step S35, firstly, a desired-image X-direction dimension Xpnt and a desired-image Y-direction dimension Ypnt are determined by the CPU 14. The desired-image X-direction dimension Xpnt is a dimension of each desired image PA as measured in the X direction parallel to the long sides of copy paper sheet CP, while desired-image Y-direction dimension Ypnt is a dimension of each desired image PA as measured in the Y direction parallel to the short sides of copy paper sheet CP. Upon calculation of the maximum horizontally-printable number My, the desired-image X-direction dimension Xpnt and desired-image Y-direction dimension Ypnt are set to be equal to the desired-image length Xgen and desired-image width Ygen, respectively (Xpnt=Xgen, Ypnt=Ygen). The maximum horizontally-printable number My is obtained as product of a X-direction maximum number Xmai and a Y-direction maximum number Ymai. The X-direction maximum number Xmai is a maximum number of the desired images PA that can be arranged in a line parallel to the X direction, and is obtained as an integer part of quotient of (Xcopy/Xpnt). The Y-direction maximum number Ymai is a maximum number of the desired images PA that can be arranged in a line parallel to the Y direction, and is obtained as an integer part of quotient of (Ycopy/Ypnt). In an example shown in (B) of FIG. 9, the integer part of quotient of (Xcopy/Xpnt) is three (3) while the integer part of quotient of (Ycopy/Ypnt) is also three (3), so that the maximum horizontally-printable number My is nine (9=3×3). Step S35 is followed by step S37 in which the CPU 14 causes the basic-function-data storage region 32 of the RAM 30 to store therein data representing the maximum horizontally-printable number My that has been calculated in step S35.

Step S37 is followed by step S39 that is implemented to calculate, as a maximum vertically-printable number (maximum vertically-printable number) Mt, a maximum number Mt of the desired images PA that are printable onto the copy paper sheet CP without any one of the desired images PA overlapping with the other desired images PA, in case of a vertical arrangement (second arrangement), as shown in (A) of FIG. 9, in which the desired images PA are arranged with the direction Y parallel to the short sides of the copy paper sheet CP being coincident with the direction parallel to the long sides of each desired image PA. In this step S39, the desired-image X-direction dimension Xpnt and desired-image Y-direction dimension Ypnt are set to be equal to the desired-image width Ygen and desired-image length Xgen, respectively (Xpnt=Ygen, Ypnt=Xgen). Thus, by replacing the desired-image width Ygen and desired-image length Xgen with each other, it is possible to rotate each desired image PA relative to the copy paper sheet CP by 90°. The maximum vertically-printable number Mt is obtained as product of the X-direction maximum number Xmai and the Y-direction maximum number Ymai. The X-direction maximum number Xmai is a maximum number of the desired images PA that can be arranged in a line parallel to the X direction, and is obtained as an integer part of quotient of (Xcopy/Xpnt). The Y-direction maximum number Ymai is a maximum number of the desired images PA that can be arranged in a line parallel to the Y direction, and is obtained as an integer part of quotient of (Ycopy/Ypnt). In an example shown in (A) of FIG. 9, the integral part of quotient of (Xcopy/Xpnt) is five (5) while the integer part of quotient of (Ycopy/Ypnt) is also two (2), so that the maximum vertically-printable number Mt is ten (10=5×2). Step S39 is followed by step S41 in which the CPU 14 causes the basic-function-data storage region 32 of the RAM 30 to store therein data representing the maximum vertically-printable number Mt that has been calculated in step S39.

Step S41 is followed by step S43 that is implemented to compare the maximum horizontally-printable number My (i.e., maximum number of the desired images PA that are printable onto the copy paper sheet CP in case of the horizontal arrangement as shown in (B) of FIG. 9) and the maximum vertically-printable number Mt (i.e., maximum number of the desired images PA that are printable onto the copy paper sheet CP in case of the vertical arrangement as shown in (A) of FIG. 9). That is, step S43 is implemented to judge whether the maximum horizontally-printable number My is equal to or larger than the maximum vertically-printable number Mt. Specifically described, in step S43, the CPU 14 reads out the data representing the maximum horizontally-printable number My and maximum vertically-printable number Mt, from the basic-function-data storage region 32 of the CPU 14, and then obtain a difference value A by subtracting the maximum vertically-printable number Mt from the maximum horizontally-printable number My. Where the difference value A is equal to or larger than zero (0), it is judged by the CPU 14 that the maximum horizontally-printable number My is equal to or larger than the maximum vertically-printable number Mt (S43: YES), and the control flow goes to step S45 in which the CPU 14 sets the maximum printable number MP to the maximum horizontally-printable number My (MP=My). Step S45 is followed by step S47 in which the CPU 14 causes the basic-function-data storage region 32 of the RAM 30 to store therein data representing that the maximum horizontally-printable number My is not smaller than the maximum vertically-printable number Mt. The maximum-printable-number calculating program of FIG. 5 is completed with implementation of step S47.

On the other hand, where the difference value A is smaller than zero (0), it is judged by the CPU 14 that the maximum horizontally-printable number My is smaller than the maximum vertically-printable number Mt (S43: NO), and the control flow goes to step S49 in which the CPU 14 sets the maximum printable number MP to the maximum vertically-printable number My (MP=Mt). Step S49 is followed by step S51 in which the CPU 14 causes the basic-function-data storage region 32 of the RAM 30 to store therein data representing that the maximum vertically-printable number Mt is larger than the maximum horizontally-printable number My. The maximum-printable-number calculating program of FIG. 5 is completed with implementation of step S51.

After step S7 has been implemented by executing the maximum-printable-number calculating program of FIG. 5, step S9 is implemented by the CPU 14 to cause the display panel 50 to display a print layout preview showing a desired number M of the desired images PA that are arranged on the copy paper sheet CP. Step S9 is implemented by executing a preview displaying program of FIG. 6, which is a subroutine program of the printing program of FIG. 3.

Figure 6:
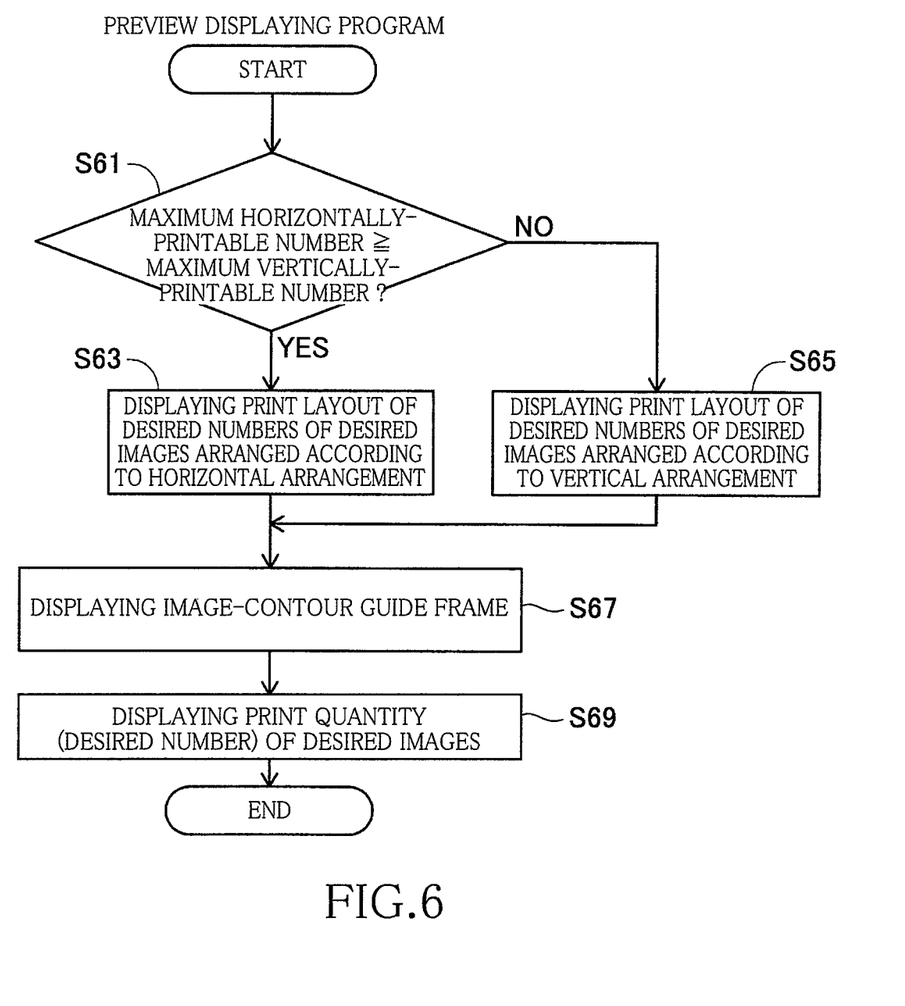
FIG. 6 is a flow chart showing a preview displaying program as a subroutine program of the of the printing program of FIG. 3.

The preview displaying program of FIG. 6 is initiated with step S61 in which the CPU 14 judges whether the maximum horizontally-printable number My is equal to or larger than the maximum vertically-printable number Mt. Where the maximum horizontally-printable number My is equal to or larger than the maximum vertically-printable number Mt (S61: YES), the control flow goes to step S63 in which the CPU14 causes the display panel 50 to display, in its left-side portion, a print layout in which the desired numbers M of the desired images PA are arranged according to the above-described horizontal arrangement. Step S63 is followed by step S67. On the other hand, where the maximum horizontally-printable number My is smaller than the maximum vertically-printable number Mt (S61: NO), the control flow goes to step S65 in which the CPU14 causes the display panel 50 to display, in its left-side portion, a print layout in which the desired numbers M of the desired images PA are arranged according to the above-described vertical arrangement. Step S65 is followed by step S67.

Figure 10:
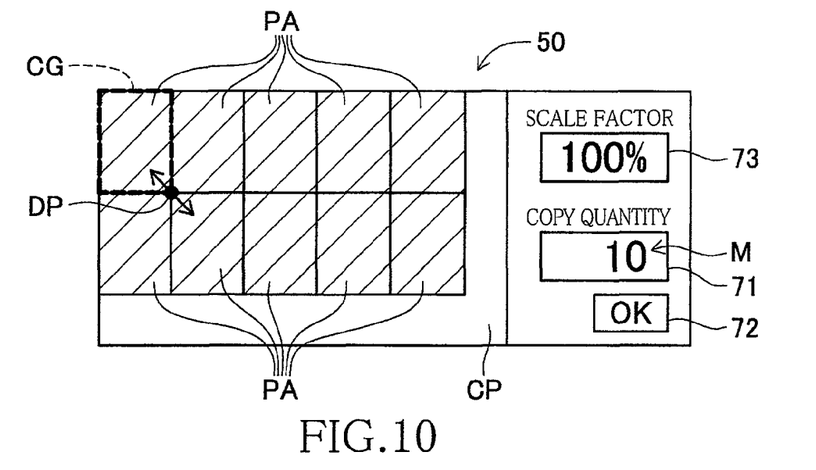
FIG. 10 is a view showing contents displayed on a display panel 50 before execution of a changing operation for changing a print-image region (desired image)

In the present embodiment, since the maximum horizontally-printable number My (=9) is smaller than the maximum vertically-printable number Mt (=10), as shown in FIG. 9, a negative judgment (NO) is obtained in step S61 whereby step S65 is implemented to display the print layout in which a total of ten desired images PA are arranged according to the vertical arrangement, as shown in FIG. 10.

In step S67, the CPU 14 causes the display panel 50 to display an image-contour guide frame CG indicative of a contour of each of the desired images PA, which is defined by the boundary, such that the displayed image-contour guide frame CG overlaps with a left-side uppermost one of the desired images PA shown in the print layout preview that is also displayed on the display panel 50 (see FIG. 10). The image-contour guide frame CG is accompanied by a draggable pointer DP that is located in a right lower end portion of the image-contour guide frame CG. A rectangular shape of the image-contour guide frame CG can be deformed by dragging the draggable pointer DP. That is, at least a part of the boundary defining each of the desired images PA can be shifted relative to the original-data-based image ID, by dragging the pointer DP, namely, by executing a changing operation for changing a size of the image-contour guide frame CG. The CPU 14 causes the display panel 50 to display the image-contour guide frame CG such that, normally, the image-contour guide frame CG is displayed less densely than each of the desired images PA shown in the print layout preview Step S67 is followed by step S69 in which the CPU 14 causes the display panel 50 to display a print quantity (copy quantity) M as the desired number of the desired images PA that are to be printed onto the copy paper sheet CP, such that the print quantity M is indicated in a print-quantity changing button 71 that is located in a right-side portion of the display panel 50, as shown in FIG. 10. In the present example, the display panel 50 displays 10 (ten) as the print quantity M. The preview displaying program of FIG. 6 is completed with implementation of step S69.

After step S9 has been implemented by executing the preview displaying program of FIG. 6, step S11 is implemented by the CPU 14 to judge whether a touch of the operator with the print-quantity changing button 71 has been detected or not. When the print-quantity changing button 71 has been touched by the operator (S11: YES), the control flow goes to step S13 in which the CPU 14 changes the print quantity M. The changed print quantity M is inputted by the operator, for example, with utilization of ten keys of a key board. It is noted that change of the print quantity M is made within a range that is not larger than the above-described maximum printable number MP.

After the print quantity M has been changed in step S13, the control flow goes back to step S9 whereby the display panel 50 is caused by the CPU 14 to display the print layout preview showing the changed quantity M of the desired images PA. For example, where the print quantity M has been reduced from ten (10) to five (5), a total of five desired images PA are shown in the displayed print layout preview. On the other hand, if the print-quantity changing button 71 is not touched by the operator (S11: NO), the control flow goes to step S15.

Thus, each time when the print-quantity changing button 71 is touched by the operator, steps S13 and S9 are implemented repeatedly whereby the print quantity M is finely adjustable.

Step S11 is implemented by the CPU 14 to judge whether a touch of the operator with the image-contour guide frame CG has been detected or not. When the image-contour guide frame CG is touched by the operator (S15: YES), the control flow goes to step S17 that is implemented by executing a print-image-region changing program of FIG. 7, which is a subroutine program of the printing program of FIG. 3. By execution of the print-image-region changing program of FIG. 7, a part of each of the desired images PA, for example, is selected as a changed desired image PA that is to be printed.

Figure 7:
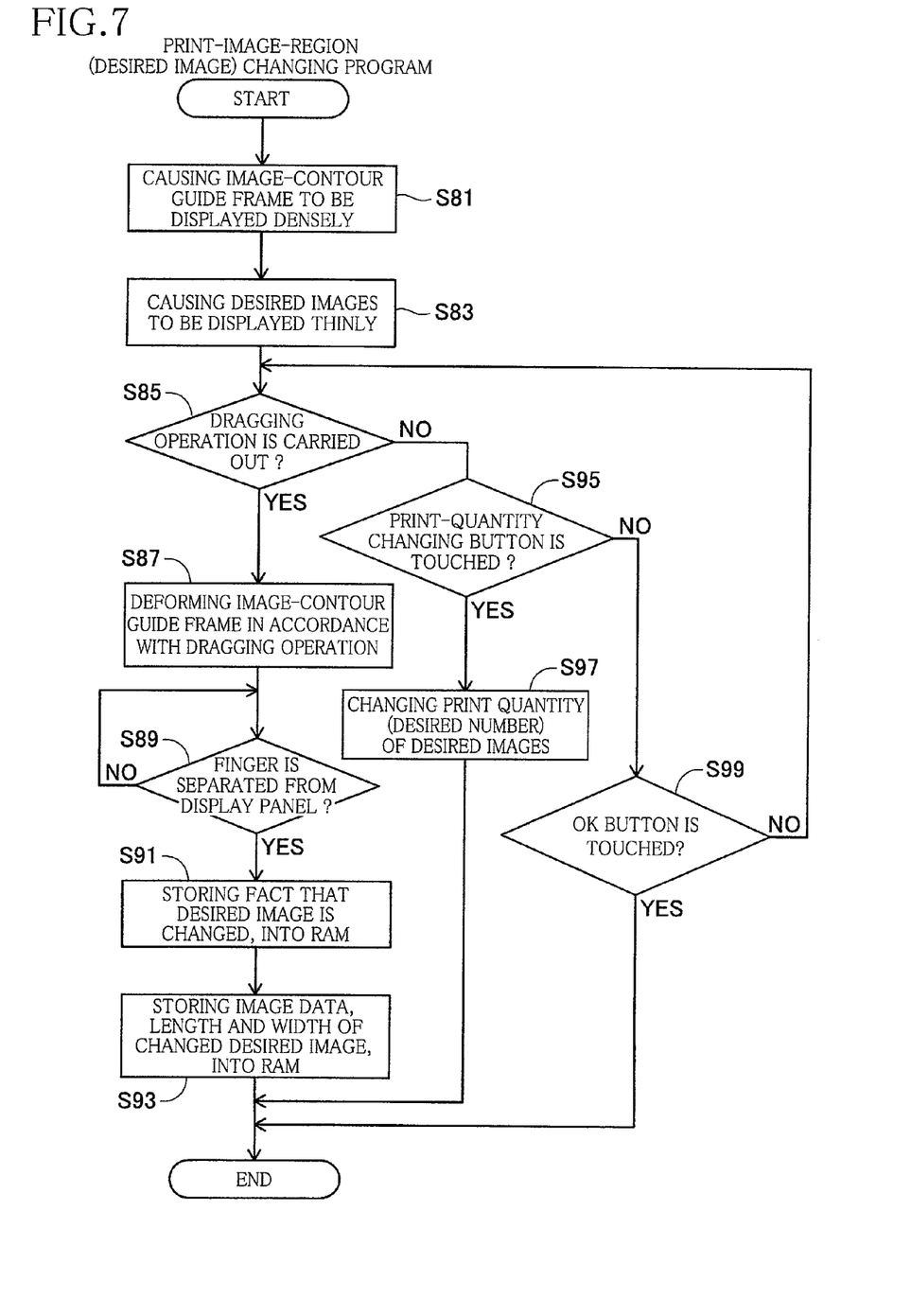
FIG. 7 is a flow chart showing a print-image-region (desired image) changing program as a subroutine program of the of the printing program of FIG. 3.

The print-image-region changing program of FIG. 7 is initiated with step S81 in which the CPU 14 controls the display panel 50 such that the image-contour guide frame CG is displayed densely. Step S81 is followed by step S83 in which all the desired images PA shown in the print layout preview are displayed thinly. Thus, while the image-contour guide frame CG is not being touched by the operator, the desired images PA are displayed more densely than the image-contour guide frame CG (see FIG. 10). While the image-contour guide frame CG is being touched by the operator, the image-contour guide frame CG is displayed more densely than the desired images PA (see FIG. 11). In other words, the CPU 14 controls the display panel 50 such that the displayed image-contour guide frame CG is more prominent than the displayed desired images PA upon execution of the changing operation which requests change of size of each of the desired images PA and which is executed by the operator with utilization of the print layout preview displayed on the display panel 50.

Figure 11:
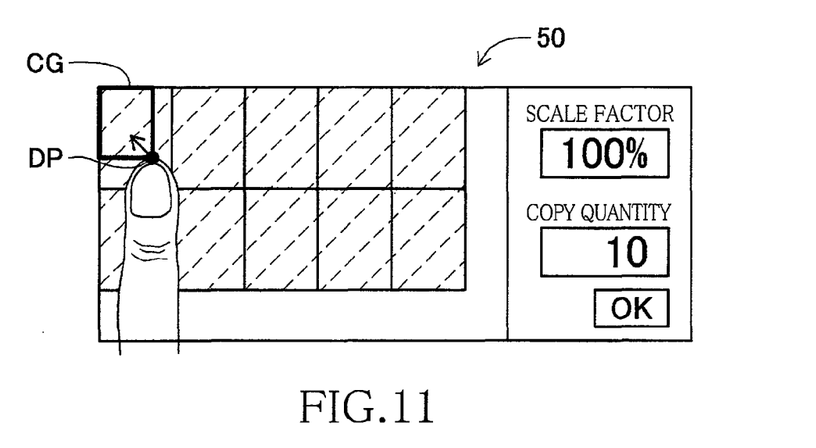
FIG. 11 is a view showing contents displayed on the display panel 50 upon execution of the changing operation.

Step S83 is followed by step S85 in which the CPU 14 judges whether a dragging operation has been carried out by the operator. The dragging operation is an operation performed by movement of an operator's finger which is held in contact with the draggable pointer DP. When the dragging operation is carried out (S85: YES), the control flow goes to step S87 in which the CPU 14 controls the display panel 50 such that the image-contour guide frame CG is deformed in accordance with the dragging operation, namely, such that at least a part of the boundary that defines the contour of each of the desired images PA is shifted in accordance with the dragging operation, whereby the size of each of the desired images PA is changed. As shown in FIG. 11, the deformation of the image-contour guide frame CG is made by moving the pointer DP, by the dragging operation, to a right lower end portion of the deformed image-contour guide frame CG.

Step S87 is followed by step S89 in which the CPU 14 judges whether the operator's finger has been separated from a surface of the display panel 50. While the operator's finger is in contact with the surface of the display panel 50 (S89: NO), the CPU 14 continues procedure for deforming the image-contour guide frame CG in accordance with the dragging operation. When the operator's finger has been separated from the surface of the display panel 50 (S89: YES), the control flow goes to step S91 in which a region whose contour is indicated by the deformed image-contour guide frame CG, is determined as the changed desired image PA. Thus, the display panel 50 serves as a command input device which is configured to receive an operator's command which requests change of the contour of each of the desired images PA and which is represented by touch of the operator within the display panel 50 that is constituted by the touch panel. Further, in step S91, the CPU 14 causes the basic-function-data storage region 32 of the RAM 30 to store therein data representing that each of the desired images PA has been changed.

Step S91 is followed by step S93 in which the CPU 14 causes the basic-function-data storage region 32 of the RAM 30 to store therein data representing the changed desired image PA and data representing the desired-image X-direction dimension Xpnt and desired-image Y-direction dimension Ypnt of the changed desired image PA. The print-image-region changing program of FIG. 7 is completed after implementation of step S93.

On the other hand, when it is judged by the CPU 14 in step S85 that the dragging operation is not being carried out, the control flow goes to step S95 in which the CPU 14 judges whether the print-quantity changing button 71 has been touched by the operator. When the print-quantity changing button 71 is touched by the operator (S95: YES), the control flow goes to step S97 in which the CPU 14 changes the print quantity M. The changed print quantity M is inputted by the operator, for example, with utilization of the ten keys of the key board. The print-image-region changing program of FIG. 7 is completed after implementation of step S97.

On the other hand, when it is judged by the CPU 14 in step S95 that the print-quantity changing button 71 has not been touched (S95: NO), the control flow goes to step S99 in which the CPU 14 judges whether an OK button 72 has been touched by the operator. When the OK button 72 has been touched by the operator (S99: YES), the print-image-region changing program of FIG. 7 is completed. When the OK button 72 has not been touched by the operator (S99: NO), the control flow goes back to step S85 in which the CPU 14 waits for the dragging operation to be carried out by the operator.

Figure 12:
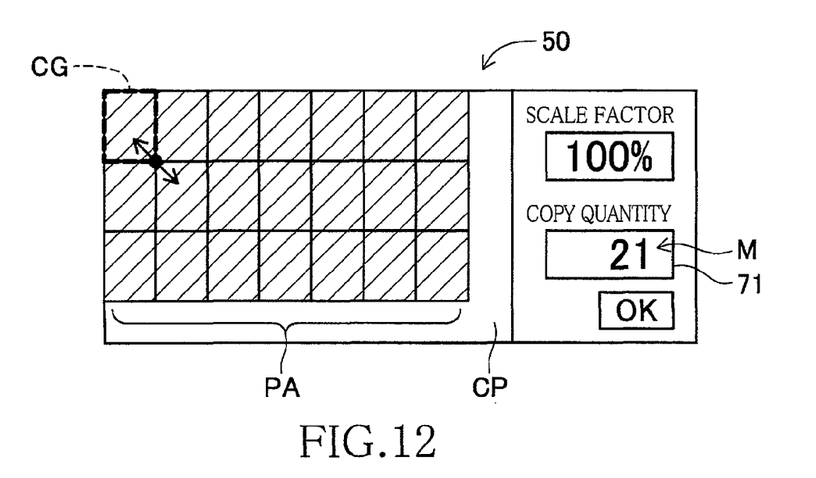
FIG. 12 is a view showing contents displayed on the display panel 50 after execution of the changing operation.

After step S17 has been implemented by executing the print-image-region changing program of FIG. 7, step S19 is implemented by the CPU 14 to judge whether print-image region has been changed or not, namely, whether the size of each desired image PA has been changed or not. When the size of each desired image PA has been changed (S19: YES), the control flow goes back to step S7 so that the CPU 14 recalculates the maximum printable number MP. Step S7 is followed by step S9 in which the CPU 14 causes the display panel 50 to display, as the above-described print layout preview, a changed layout preview showing the recalculated maximum printable number MP of the changed desired images PA that are arranged on the copy paper sheet CP. In an example shown in FIG. 12, the recalculated maximum printable number MP (=21) is displayed as the print quantity (copy quantity) M. Thus, the change of the size of each desired image PA (i.e., change of the print-image region) is reflected on the print quantity M and the print layout preview.

On the other hand, when the CPU 14 judges that the size of each desired image PA has not been changed (S19: NO), the control flow goes back to step S9 whereby the unchanged print layout preview and the unchanged print quantity M are displayed, as in an example shown in FIG. 10.

When the CPU 14 judges in step S15 that the image-contour guide frame CG has not been touched by the operator (S15: NO), the control flow goes to step S21 in which the CPU14 judges whether the OK button 72 has been touched by the operator. When the OK button 72 has not been touched (S21: NO), the control flow goes to step S11 in which the CPU 14 judges whether the print-quantity changing button 71 has been touched or not. On the other hand, when the OK button 72 has been touched (S21: YES), the control flow goes to step S23.

In step S23, upon detection of pressing of a printing start button by the operator, the CPU 14 commands the printer portion 54 to start a printing operation. In this step S23, the CPU 14 supplies, as the above-described print data, a preview-based print data to the printer portion 54 whereby the printer portion 54 performs the printing operation for printing, in conformity with the print layout preview displayed on the display panel 50, the print quantity M of the desired images PA arranged according to the print layout, onto a single copy paper sheet CP.

Thus, the operator can finely adjust the print layout by repeating steps S13 and S17, namely, by repeating change of the print quantity M and/or the print image region, until the operator presses the OK button 72. Each time the change of the print quantity M and/or the print image region is made, the change is reflected on the print layout view displayed on the display panel 50. The operator, prior to execution of the printing operation, can visually confirm the print layout by seeing the print layout preview displayed on the display panel 50. When the operator is satisfied with the print layout shown in the print layout preview, the operator can start the printing operation by pressing the OK button 72.

In the present embodiment, a portion of the CPU 14 which is assigned to implement the above-described step S5 constitutes at least a part of a print-image-region selector of the print data generating device; a portion of the CPU 14 which is assigned to implement the above-described step S3 constitutes at least a part of a media size recognizer of the data generating device; a portion of the CPU 14 which is assigned to implement the above-described step S7 constitutes at least a part of a print layout determiner of the data generating device and also at least a part of a print layout changer of the data generating device; a portion of the CPU 14 which is assigned to implement the above-described step S9 constitutes at least a part of a display controller of the data generating device; a portion of the CPU 14 which is assigned to implement the above-described step S17 constitutes at least a part of a desired-image size changer of the data generating device; a portion of the CPU 14 which is assigned to implement the above-described step S35 constitutes at least a part of a first maximum-image-number determiner of the print layout determiner; a portion of the CPU 14 which is assigned to implement the above-described step S39 constitutes at least a part of a second maximum-image-number determiner of the print layout determiner; a portion of the CPU 14 which is assigned to implement the above-described step S43 constitutes at least a part of a maximum number comparator of the print layout determiner; and a portion of the CPU 14 which is assigned to implement the above-described step S23 constitutes at least a part of a printer controller of the print data generating device.

In the multifunction device 10 constructed according to the present embodiment, each time the size of each of the desired images PA is changed, the change is reflected on the print quantity M and the print layout preview. It is therefore possible to efficiently arrange the desired images PA on the copy paper sheet CP. Where a plurality of images each originating from a small scanned medium sheet such as business card are to be printed onto a single copy paper sheet, the images can be printed highly efficiently onto the single copy paper sheet without causing the copy paper sheet to have a large blank space (onto which no image is printed). Further, the operator, prior to execution of the printing operation, can visually confirm the print layout that has been changed as a result of the change of the size of each desired image PA, by seeing the print layout preview displayed on the display panel 50. The visual confirmation of the changed print layout prior to execution of the printing operation makes it possible to reduce a length of time required for completing the printing operation.

Further, in the multifunction device 10 of the present embodiment, the display panel 50 displays the image-contour guide frame CG that facilitate the operator to change the size of each of the desired images PA such that the displayed image-contour guide frame CG overlaps with one of the desired images PA. In response to touch of the operator within the image-contour guide frame CG, the CPU 14 changes the size of the image-contour guide frame CG, and sets an image region surrounded by the image-contour guide frame CG (whose size has been changed), as the changed desired image. Thus, the operator can change the size of each desired image PA while seeing the print layout preview (on which the change of the size of each desired image PA is reflected). The print layout preview displayed on the display panel 50 allows the operator to play his or her hunch in the changing operation, and accordingly facilitates the operation to perform the changing operation.

Further, in the multifunction device 10 of the present embodiment, where the original-data-based image ID includes the blank portion MA in addition to the medium-content representing portion DA, the blank portion MA can be trimmed off from the original-data-based image ID, whereby the medium-content representing portion DA can be selected as the print image region. Therefore, even where the scanned medium is smaller than the flat bed 81, the images can be printed highly efficiently onto a copy paper sheet without causing the blank portion MA to be printed onto the copy paper sheet. It is noted that the trimming-off of the blank portion MA can be made either automatically by function of the multifunction device 10 or manually by the operator.

Further, in the multifunction device 10 of the present embodiment, while the display panel 50 is not being touched by the operator, the desired images PA are displayed more densely than the image-contour guide frame CG (see FIG. 10). While the display panel 50 is being touched by the operator, the image-contour guide frame CG is displayed more densely than the desired images PA (see FIG. 11). In other words, the CPU 14 controls the display panel 50, such that the displayed image-contour guide frame CG is more prominent than the displayed desired images PA upon execution of the changing operation which requests change of size of each of the desired images PA and which is executed by the operator with utilization of the print layout preview displayed on the display panel 50, and such that the displayed desired images PA are more prominent than the displayed image-contour guide frame CG while the changing operation is not being executed. This arrangement is effective to facilitate the operator to visually confirm the contour of each desired image PA and also to change the size of each desired image PA, thereby resulting in further improvement of operability of the multifunction device 10 as a whole.

While the preferred embodiment of the present invention has been described above in detail by reference to the accompanying drawings, for illustrative purpose only, it is to be understood that the present invention may be embodied with various changes, modifications and improvements.

In the above-described embodiment, the size of each desired images PA is changed by shifting at least a part of the boundary surrounding each desired image (i.e., print image region) PA, relative to the original-data-based image ID, without changing a scale factor of each desired image PA and the original-data-based image ID. However, the size of each desired images PA may be changed by changing the scale factor of each desired image PA and the original-data-based image ID (for example, by changing the scale factor of 100% to a smaller or larger one), without shifting the boundary surrounding each desired image (i.e., print image region) PA, relative to the original-data-based image ID. The increase or reduction of the scale factor may be initiated, for example, by touching a scale-factor changing button 73 that is also displayed on the display panel 50. The scale factor may be changed by using, for example, an image-scale-factor guide frame SG that is also displayed on the display panel 50. The image-scale-factor guide frame SG is displayed in the same manner as the image-contour guide frame CG, and is accompanied by the draggable pointer DP that is located in a portion of the image-scale-factor guide frame SG. The scale factor is changed to a value corresponding to a size of the image-scale-factor guide frame SG, which can be changed by dragging the pointer DP.

In the above-described embodiment, the trimming-off of the blank portion MA, i.e., the selection of the medium-content representing portion DA as the print image region, is made automatically by function of the multifunction device 10. However, the selection of the medium-content representing portion DA as the print image region may be made manually by the operator, for example, by touching a trimming guide frame TG that is also displayed on the display panel 50. The trimming guide frame TG is displayed in the same manner as the image-contour guide frame CG, and is accompanied by the draggable pointer DP that is located in a portion of the trimming guide frame TG. The print image region is surrounded by the trimming guide frame TG so that the print image region can be adjusted by touching the trimming guide frame TG.

While the scanner portion 56 of the multifunction device 10 is provided with the flat bed 81 in the above-described embodiment, the provision of the flat bed 81 is not essential. Even in an arrangement in which the scanner portion 56 is provided with a line sensor, the original-data-based image ID could include the blank portion MA in addition to the medium-content representing portion DA where the scanned medium has a width larger than a width of the line sensor. Therefore, the present invention is applicable to the arrangement in which the line sensor is provided in the scanner portion 56.

What is claimed is:

1. A print data generating device for generating a print data that is used for printing a plurality of desired images onto a print medium, said print data generating device comprising:
a display;
a print-image-region selector configured to select a print image region which is a region of an original-data-based image that is based on an original image data, such that the selected print image region, which is surrounded by a boundary, corresponds to each of the plurality of desired images that are to be printed onto the print medium;
a media size recognizer configured to recognize a size of the print medium;
a print layout determiner configured to determine, based on a size of the print image region and the recognized size of the print medium, a print layout of the plurality of desired images that are to be printed onto the print medium, such that a number of the desired images printable onto the print medium is maximized in the determined print layout; and
a display controller configured to cause said display to display a print layout preview showing a desired number of the desired images that are arranged according to the determined print layout, such that the desired number of the desired images is not larger than the maximized number of the desired images,
wherein said print data generating device is configured to generate a preview-based print data as the print data which is used for printing, in conformity with the print layout preview displayed on said display, the desired number of the desired images arranged according to the determined print layout, onto the print medium,
wherein the print medium is a generally rectangular-shaped medium having a long side and a short side that is shorter that the long side of the print medium,
wherein each of the plurality of desired images corresponding to the selected print image region is a generally rectangular-shaped image having a long side and a short side that is shorter than the long side of each of the desired images,
and wherein said print layout determiner comprises:
(i) a first maximum-image-number determiner that is configured to determine, as a first maximum number, a maximum number of the desired images that are printable onto the print medium in case of a first arrangement in which the desired images are arranged such that a direction parallel to the long side of the print medium is coincident with a direction parallel to the long side of each of the desired images;
(ii) a second maximum-image-number determiner that is configured to determine, as a second maximum number, a maximum number of the desired images that are printable onto the print medium in case of a second arrangement in which the desired images are arranged such that the direction parallel to the long side of the print medium is coincident with a direction parallel to the short side of each of the desired images; and
(iii) a maximum number comparator that is configured to compare the first maximum number and the second maximum number with each other, such that said print layout determiner determines, as the print layout, a first print layout in which the desired images are arranged according to the first arrangement, where the first maximum number is greater than the second maximum number, and such that said print layout determiner determines, as the print layout, a second print layout in which the desired images are arranged according to the second arrangement, where the second maximum number is greater than the first maximum number.

2. The print data generating device according to claim 1, wherein the desired number of the desired images is equal to the maximized number of the desired images, so that said display controller is configured to cause said display to display the print layout preview showing the maximized number of the desired images that are arranged according to the determined print layout, and so that said print data generating device is configured to generate the preview-based print data which is used for printing the maximized number of the desired images arranged according to the determined print layout, onto the print medium.

3. The print data generating device according to claim 1, further comprising:
a desired-image size changer configured to change the size of each of the plurality of desired images, in accordance with a changing operation which requests change of the size of each of the plurality of desired images and which is executed by an operator with utilization of the print layout preview displayed on said display; and
a print layout changer configured to change, based on the changed size of each of the plurality of desired images, the print layout, wherein said display controller is configured to cause said display to display, as the print layout preview, a changed layout preview showing the desired number of the desired images each of which has the changed size and which are arranged according to the changed print layout.

4. The print data generating device according to claim 3, wherein said desired-image size changer is configured to change the size of each of the plurality of desired images, by shifting at least a part of the boundary surrounding the print image region, relative to the original-data-based image.

5. The print data generating device according to claim 3, wherein said desired-image size changer is configured to change the size of each of the plurality of desired images, by changing a scale factor of the original-data-based image, without shifting the boundary surrounding the print image region, relative to the original-data-based image.

6. The print data generating device according to claim 3,
wherein said display includes a touch panel such that the print layout preview is displayed on said touch panel,
and wherein said desired-image size changer is configured to change the size of each of the plurality of desired images, in accordance with the changing operation that is executed by touch of the operator within said touch panel.

7. The print data generating device according to claim 3,
wherein said display controller is configured to cause said display to display, in addition to the print layout preview, an image-contour guide frame indicative of a contour of each of at least one of the plurality of desired images, the contour being defined by the boundary that surrounds the print image region,
and wherein said desired-image size changer is configured to change the size of each of the plurality of desired images, in accordance with the changing operation that is executed for changing a size of the image-contour guide frame.

8. The print data generating device according to claim 7, wherein said display controller is configured to cause said display to display the print layout preview and the image-contour guide frame, such that the displayed image-contour guide frame is more prominent than the desired images shown in the displayed print layout preview upon execution of the changing operation.

9. The print data generating device according to claim 1, further comprising a scanner that is configured to read content of a scanned medium and to obtain the original image data based on the read content of the scanned medium, so that said print-image-region selector is configured to select the print image region which is the region of the original-data-based image that is based on the original image data obtained by said scanner.

10. The print data generating device according to claim 9, wherein said print-image-region selector is, where the original-data-based image includes a blank portion that does not represent the content of the scanned medium, configured to select the print image region such that the selected print image region does not contain the blank portion.

11. The print data generating device according to claim 1, further comprising:

a printer; and a printer controller that is configured to cause said printer to execute, based on the preview-based print data, a printing operation for printing the desired number of the desired images onto the print medium.

* * * * *